United States Patent
Kizhakkethara et al.

(10) Patent No.: US 9,631,668 B2
(45) Date of Patent: Apr. 25, 2017

(54) WASHER MEMBER IN VALVE HOUSING OF ENGINE

(71) Applicant: Caterpillar Inc., Peoria, IL (US)

(72) Inventors: Indrajith Kizhakkethara, West Lafayette, IN (US); Prabhu Nagaraj, Chennai (IN); Mallikarjuna Masala, Chennai (IN)

(73) Assignee: Caterpillar Inc., Peoria, IL (US)

( * ) Notice: Subject to any disclaimer, the term of this patent is extended or adjusted under 35 U.S.C. 154(b) by 72 days.

(21) Appl. No.: 14/666,385

(22) Filed: Mar. 24, 2015

(65) Prior Publication Data
US 2016/0281547 A1  Sep. 29, 2016

(51) Int. Cl.
| F01M 9/10 | (2006.01) |
| F16C 29/02 | (2006.01) |
| F01L 1/24 | (2006.01) |
| F16C 17/08 | (2006.01) |
| F02M 61/14 | (2006.01) |

(52) U.S. Cl.
CPC ............ F16C 29/02 (2013.01); F01L 1/2422 (2013.01); F16C 17/08 (2013.01); *F01L 2107/00* (2013.01); *F02M 61/14* (2013.01); *F16C 2360/22* (2013.01)

(58) Field of Classification Search
CPC ......... F01L 1/2422; F16C 17/08; F16C 29/02; F02M 61/14
USPC ................................ 123/90.38, 90.45, 90.44
See application file for complete search history.

(56) References Cited

U.S. PATENT DOCUMENTS

| 3,937,541 A | 2/1976 | Alling et al. |
| 4,092,963 A * | 6/1978 | Vrooman ............... F02M 31/18 |
| | | 123/549 |
| 5,624,343 A | 4/1997 | Krisher |
| 7,007,651 B2 | 3/2006 | Spath |
| 7,637,238 B2 | 12/2009 | Haefner et al. |
| 8,579,569 B2 | 11/2013 | Schendel |

FOREIGN PATENT DOCUMENTS

| DE | 102007041843 | 3/2009 |
| GB | 870861 | 6/1961 |
| GB | 2434623 | 8/2007 |
| WO | 9706353 | 2/1997 |

* cited by examiner

*Primary Examiner* — Ching Chang
(74) *Attorney, Agent, or Firm* — Miller, Matthias & Hull

(57) ABSTRACT

A washer member disposed in a valve housing of an engine is disclosed. The washer member resiliently supports an injector push member via an elastic member and receives a pair of hydraulic lash adjusters for operating an inlet valve and an outlet valve of a cylinder of the engine. The washer member includes a base portion adapted to abut a support member disposed within the valve housing. The support member defines a clearance with the valve housing to movably dispose the pair of hydraulic lash adjusters within the valve housing. The washer member further includes a side portion extending from the base portion. The side portion is configured to define a lateral movement of the elastic member within a tolerance limit. The side portion is further configured to define a rotational movement of the washer member within a tolerance limit.

20 Claims, 6 Drawing Sheets

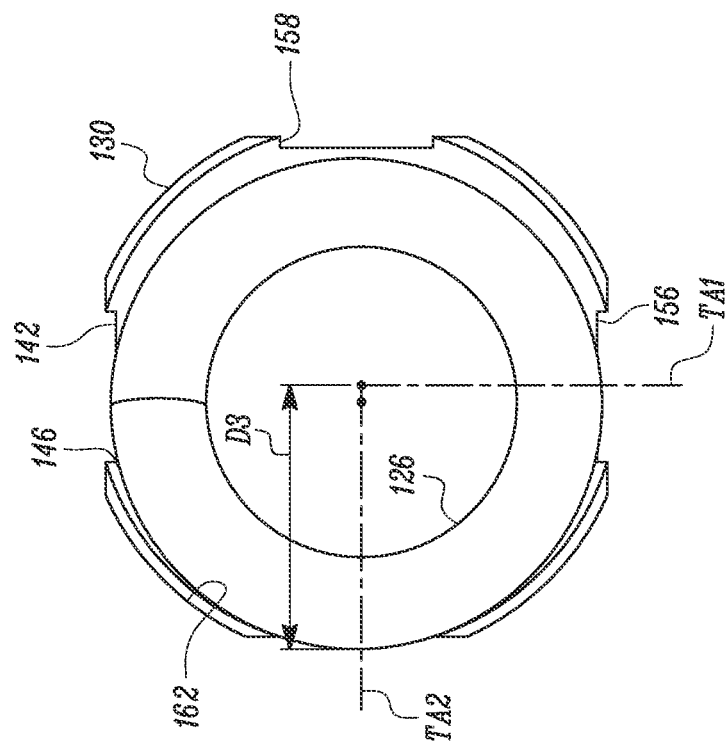
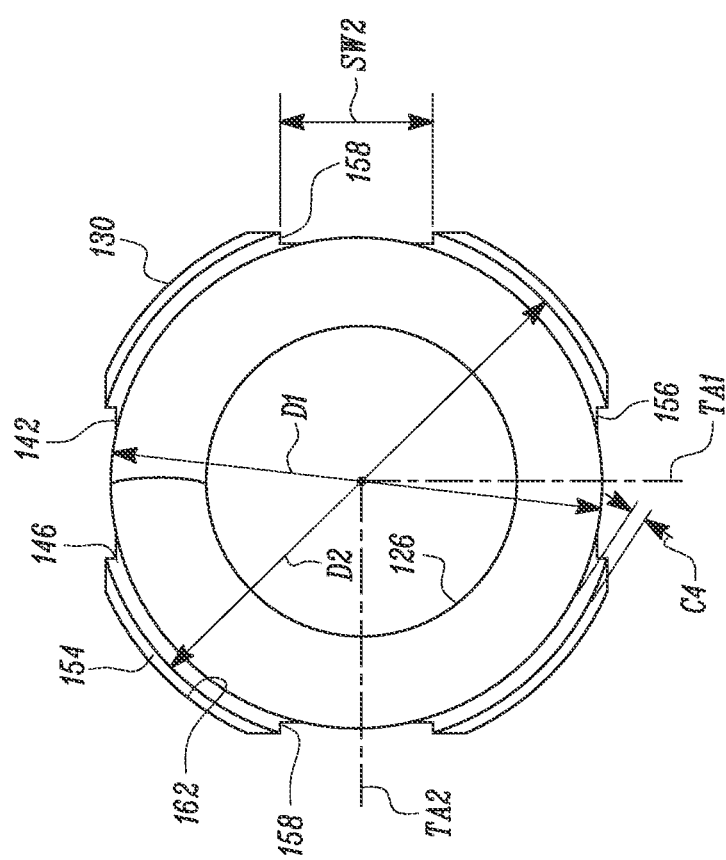
FIG. 6A
FIG. 6B

WASHER MEMBER IN VALVE HOUSING OF ENGINE

TECHNICAL FIELD

The present disclosure relates to a washer member disposed in a valve housing of an engine.

BACKGROUND

Generally, an engine includes a cylinder block, a cylinder head, valve housings and cover members for supporting and enclosing various engine components including rocker arms, push rods and injector pushers. The push rods and the injector pushers are movable within the cylinder head and the valve housings to actuate inlet and outlet valves and fuel injectors. Based on applications of the engine and customer requirements, design modifications and component developments have been happening continuously on various components related to the engine including the push rods, the rocker arms and the injector pushers. In the case of push rods, hydraulic lash adjusters are used in place of solid push rods for improving reliability and operating efficiency of the engine. The hydraulic lash adjuster includes a cylinder and a piston arrangement for hydraulically adjusting a lash in inlet and outlet valve systems during operation of the engine. Developing new cylinder head and/or valves housings to accommodate the hydraulic lash adjusters may result into additional cost and consume more time to develop the component. Further, various hardware elements, such as washers and springs used to assemble the hydraulic lash adjusters may also require design changes or replacement thereof, which further add cost to the design and development of the engine.

GB Patent Number 2434623 discloses a thrust washer of a planetary gear of a differential assembly. The thrust washer has an anti-rotation feature. In one embodiment a washer has flats. In another embodiment a washer has protruding ribs. In each case the anti-rotation feature engages an abutment provided by a differential casing. The washers are preferably sintered and have different profiles on the opposite faces thereof.

SUMMARY OF THE DISCLOSURE

In one aspect of the present disclosure, a washer member disposed in a valve housing of an engine is provided. The washer member is configured to resiliently support an injector push member via an elastic member. The valve housing is configured to receive a pair of hydraulic lash adjusters for operating an inlet valve and an outlet valve of a cylinder of the engine. The washer member includes a base portion adapted to abut a support member disposed within the valve housing. The support member is adapted to define a clearance with the valve housing to movably dispose the pair of hydraulic lash adjusters within the valve housing. The washer member further includes a side portion extending from the base portion. The side portion is configured to define a lateral movement of the elastic member within a tolerance limit. The side portion is further configured to define a rotational movement of the washer member within a tolerance limit.

In another aspect of the present disclosure, a washer member disposed in a valve housing of an engine is provided. The washer member is configured to resiliently support an injector push member via an elastic member. The washer member includes a base portion disposed on a support member of the valve housing. The base portion includes a first surface adapted to abut the support member and a second surface distal to the first surface. The second surface is adapted to abut the elastic member. The washer member further includes a side portion extending from the second surface of the base portion and a plurality of slots defined in the side portion. The plurality of slots is configured to define a rotational movement of the washer member within a tolerance limit. The plurality of slots is further configured to define a lateral movement of the elastic member within a tolerance limit.

In yet another aspect of the present disclosure, a washer member disposed in a valve housing of an engine is provided. The washer member is configured to resiliently support an injector push member via an elastic member. The valve housing is configured to receive a pair of hydraulic lash adjusters for operating an inlet valve and an outlet valve of a cylinder of the engine. The washer member includes a base portion adapted to abut a support member disposed within the valve housing. The support member is adapted to define a clearance with the valve housing to movably dispose the pair of hydraulic lash adjusters within the valve housing. The base portion includes a first surface adapted to abut the support member and a second surface distal to the first surface. The second surface is adapted to abut the elastic member. The washer member further includes a side portion extending from the second surface of the base portion. The washer member further includes at least a first slot defined in the side portion. The first slot is configured to define a rotational movement of the washer member within a tolerance limit. The washer member further includes a pair of second slots defined in the side portion spaced apart from the first slot. The pair of second slots is configured to define a lateral movement of the elastic member within a predefined tolerance limit.

Other features and aspects of this disclosure will be apparent from the following description and the accompanying drawings.

BRIEF DESCRIPTION OF THE DRAWINGS

FIGS. 6A and 6B illustrate movement of an elastic member relative to the washer member, according to an embodiment of the present disclosure.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
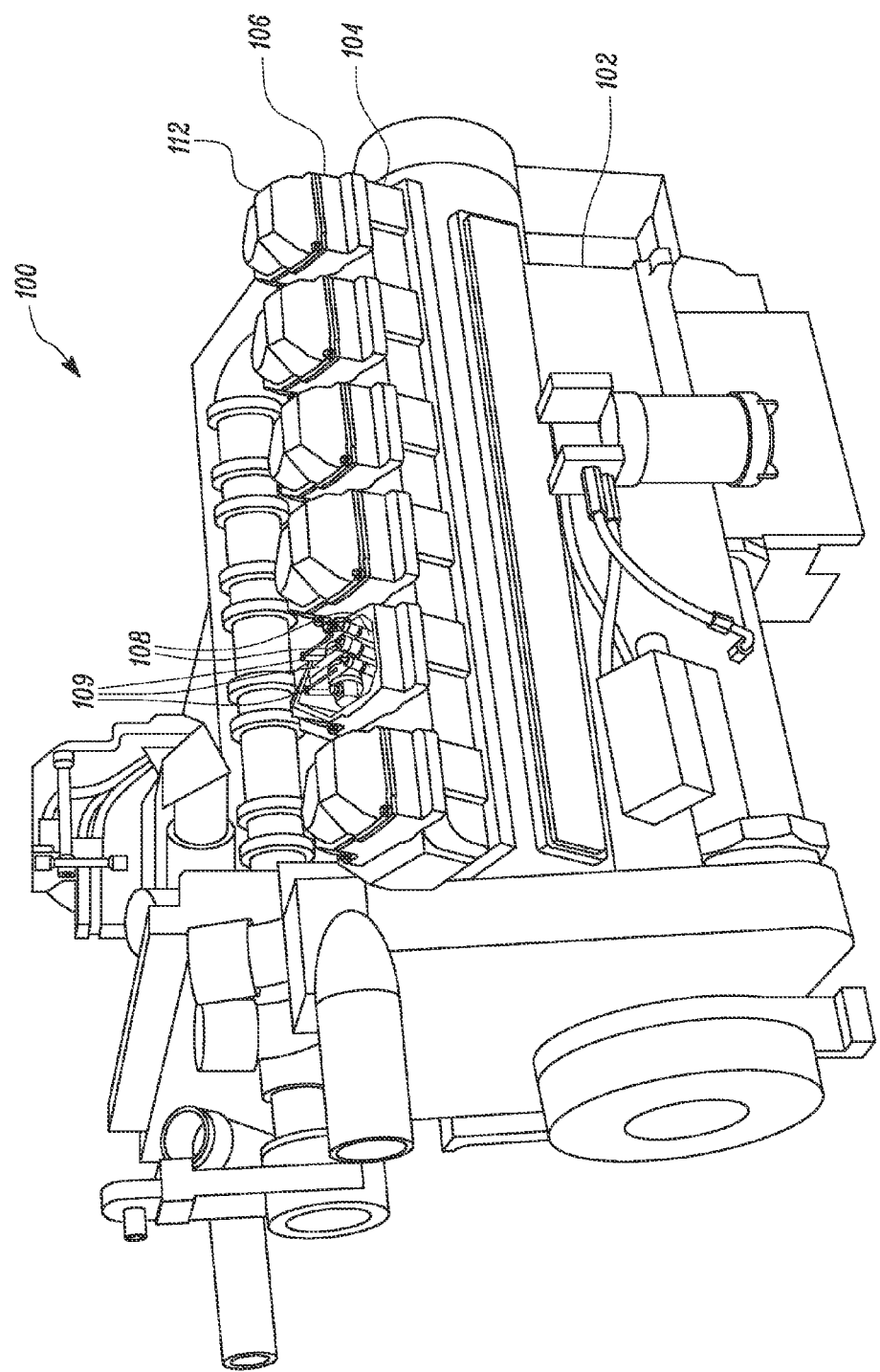
FIG. 1 is a perspective view of an engine showing a valve housing, according to an embodiment of the present disclosure.

FIG. 1 illustrates a perspective view of an engine 100 used in machines, such as on-highway and off-highway vehicles. The machines may be used in various industries, such as mining, construction, agriculture, and various other industries known in the art. However, it may be contemplated that the engine 100 may be used in various other applications, such as generator set.

Referring to FIG. 1, a v-type engine is shown as an example for illustration purpose of the present disclosure. However, it may be contemplated that the engine 100 may include a single cylinder or a plurality of cylinders in various configurations such as, inline engine. The engine 100 may be run by fuels such as, for example, diesel, gasoline, a gaseous fuel, or a combination thereof.

The engine 100 includes a cylinder block 102 defining one or more cylinders (not shown) therein. The engine 100 further includes a cylinder head 104 mounted on the cylinder block 102. The cylinder head 104 may define one or more inlet ports for receiving ambient air and one or more outlet ports for exiting exhaust gas from the cylinders. Each inlet port may include one or more inlet valves that may be actuated by a rocker arm 109 to selectively allow ambient air into the cylinder. Similarly, each outlet port may include one or more outlet valves that may be actuated by another rocker arm 109 to selectively exit the exhaust gas from the cylinder. The engine 100 may further include a fuel injector for selectively supplying fuel to the cylinder. The fuel injector may be disposed in the cylinder head 104 and may be actuated by another rocker arm 109 to selectively supply the fuel.

The engine 100 further includes a valve housing 106 disposed on the cylinder head 104 for each cylinder. The valve housing 106 is configured to movably receive a pair of valve push members 108. Each of the pair of valve push members 108 is configured to actuate the inlet valves and the outlet valves via the respective rocker arms 109. The valve housing 106 is further configured to movably dispose an injector push member 110 (shown in FIG. 2). The injector push member 110 may be configured to actuate the fuel injector to supply fuel to the cylinder. The pair of valve push members 108 and the injector push member 110 may be actuated based on a speed of a cam shaft (not shown). The camshaft may be drivably coupled to a crankshaft of the engine 100. The valve housing 106 of the engine 100 may further include a cover member 112. The valve housing 106 and the cover member 112 may together enclose the rocker arms 109, the valve push members 108 and the injector push member 110.

Figure 2:
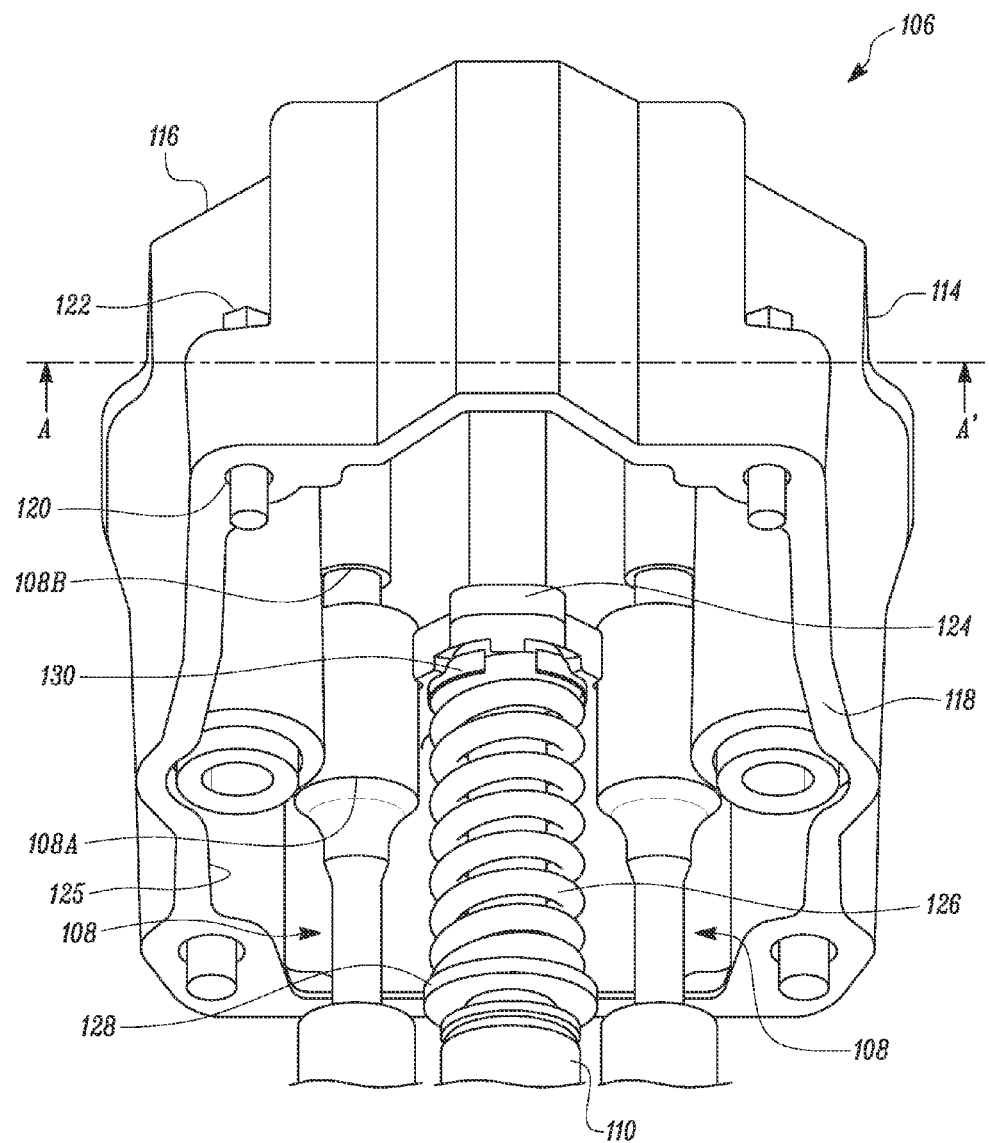
FIG. 2 is a bottom perspective view of the valve housing, according to an embodiment of the present disclosure.

FIG. 2 is a bottom perspective view of the valve housing 106, according to an embodiment of the present disclosure. The valve housing 106 includes a wall member 114 defining a top surface 116 and a bottom surface 118 distal to the top surface 116. The wall member 114 may include a plurality of mounting holes (not shown) adjacent to the top surface 116 to couple the cover member 112 therewith via fastening members, such as bolts. The wall member 114 further includes a plurality of through holes 120 defined adjacent to the bottom surface 118 to receive a plurality of fastening members 122 therethrough. The plurality of fastening members 122 may engage with a plurality of mounting holes (not shown) defined on the cylinder head 104 to mount the valve housing 106 on the cylinder head 104. In an embodiment, the valve housing 106 may be a casting component. In various embodiments, the valve housing 106 may be manufactured through any known manufacturing method.

The valve housing 106 further includes a support member 124. The support member 124 may extend radially from an inner surface 125 of the wall member 114. The support member 124 is configured to resiliently support the injector push member 110 via an elastic member 126 within the valve housing 106. The support member 124 may also be integrally formed with the wall member 114. In the illustrated embodiment, the elastic member 126 is a coil spring. The support member 124 is configured to movably support the injector push member 110 within the valve housing 106. The injector push member 110 may include a top end configured to couple to the respective rocker arm 109 to actuate the fuel injector to supply fuel in the cylinder. The injector push member 110 may further include a bottom end (not shown) having a roller. The roller may be configured to follow a lobe of the camshaft. The injector push member 110 may move up and down based on a profile of the lobe and the speed of the camshaft. The injector push member 110 further includes a flange 128 extending radially from an outer circumference (not shown) thereof. The elastic member 126 is disposed between the flange 128 and the support member 124 around the outer circumference of the injector push member 110. The injector push member 110 may move up against a biasing force of the elastic member 126.

The valve housing 106 further includes a washer member 130 disposed between the elastic member 126 and the support member 124. The washer member 130 is configured to resiliently support the injector push member 110 within the valve housing 106. The washer member 130 will be described in detail hereinafter with reference to FIG. 4-6.

The valve housing 106 is further configured to movably receive the pair of valve push members 108 for operating the inlet valves and the outlet valves. In the illustrated embodiment, the valve push members 108 are hydraulic lash adjusters. The valve push members 108 are hereinafter referred as 'the hydraulic lash adjusters 108' for illustration purpose of the present disclosure. In an example, the hydraulic lash adjusters 108 may include a cylinder body 108A configured to slidably receive a piston member (not shown) therein. The piston member may be further coupled to a piston rod 108B. A free end of the cylinder body 108A may be coupled to a lifter (not shown). The lifter may include a roller to follow a lobe of the camshaft. A free end of the piston rod 108B may be coupled to the respective rocker arms 109. Each of the pair of hydraulic lash adjusters 108 is movably disposed between the support member 124 and the inner surface 125 of the wall member 114, as shown in FIG. 2. The hydraulic lash adjusters 108 may be configured to hydraulically adjust a lash for each of the inlet and outlet valves during operation of the engine 100.

Figure 3:
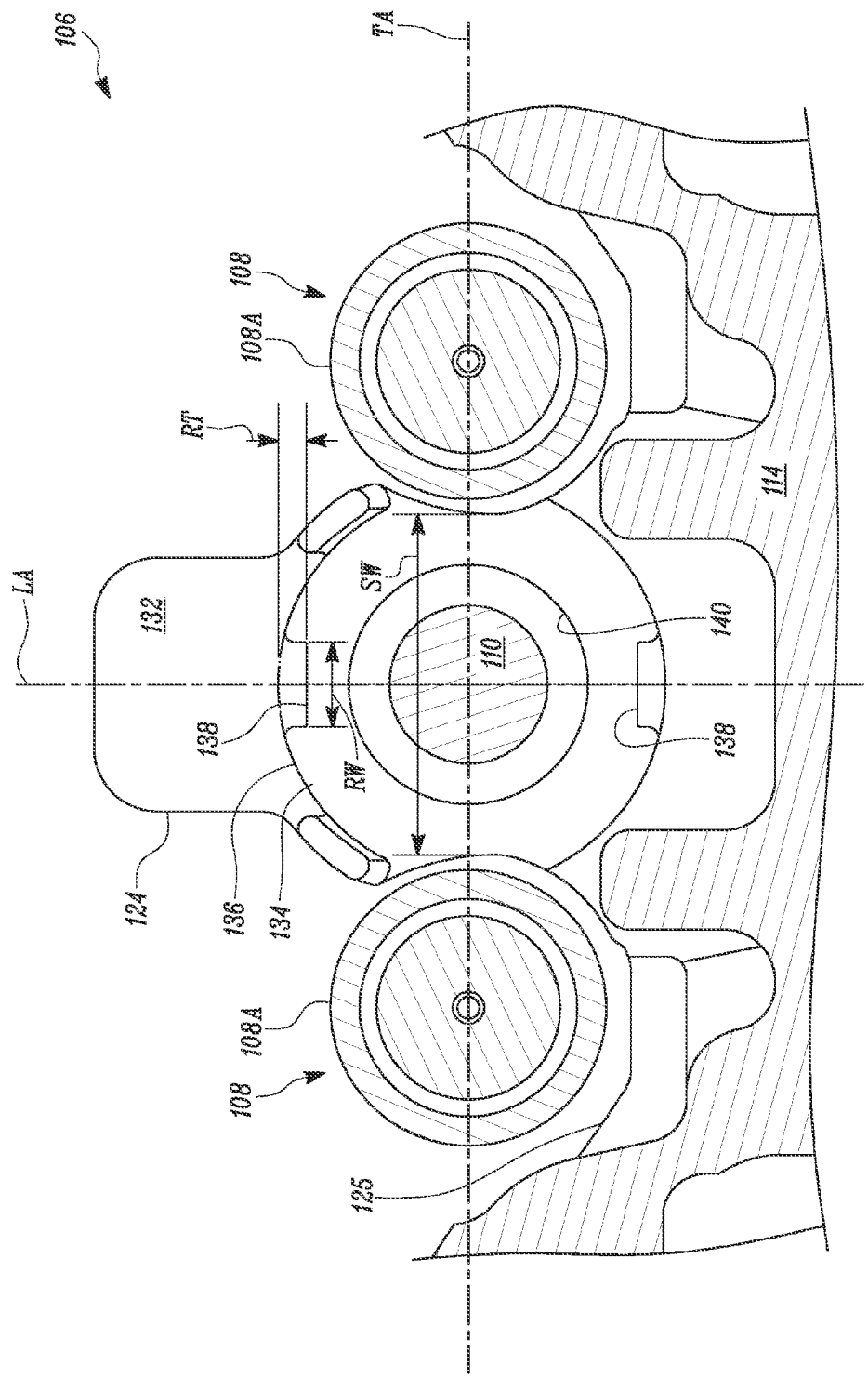
FIG. 3 is a sectional view of the valve housing taken along line A-A' of FIG. 2, according to an embodiment of the present disclosure.

FIG. 3 is a sectional view of the valve housing 106 taken along line A-A' of FIG. 2, according to an embodiment of the present disclosure. The elastic member 126 and the washer member 130 are removed from FIG. 3 for illustration purpose. The support member 124 is an elongate body 132 extending from the inner surface 125 of the wall member 114. The support member 124 further includes a base surface 134 configured to receive the washer member 130. The base surface 134 is further defined by a wall surface 136. In the illustrated embodiment, the support member 124 includes a pair of ribs 138 extending from the wall surface 136. Specifically, the pair of ribs 138 extends along a longitudinal axis LA defined by the base surface 134 of the support member 124. It may also be contemplated that the support member 124 may include only one rib 138. Each of the ribs 138 may define a thickness RT and a width RW. The support member 124 further defines a width SW adapted to define a clearance with the inner surface 125 of the wall member 114 to movably dispose the pair of hydraulic lash adjusters 108 within the valve housing 106. The width SW may be defined along a transverse axis TA defined by the base surface 134 of the support member 124. The base surface 134 further includes an opening 140 configured to movably receive the injector push member 110 therethrough.

Figure 4:
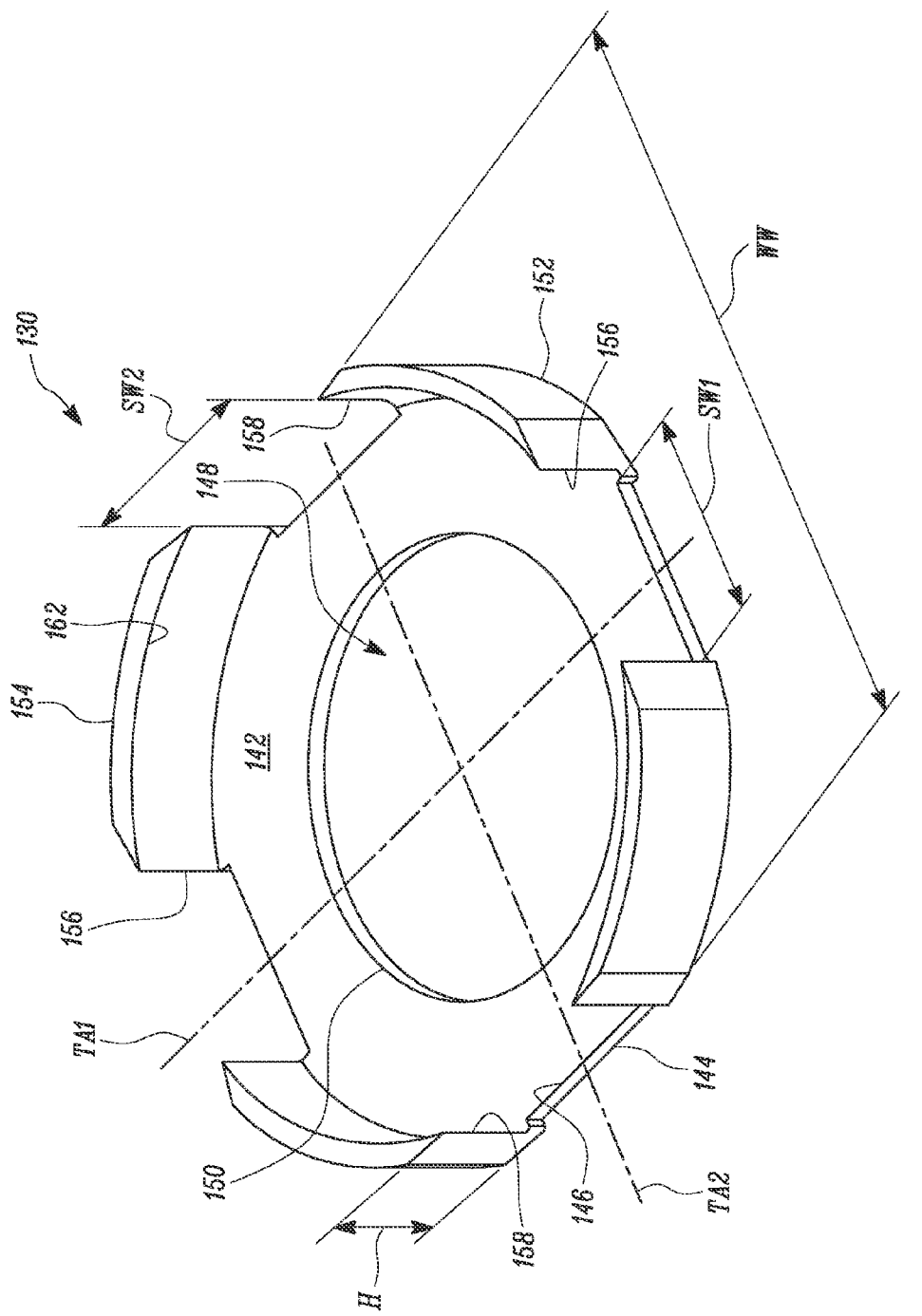
FIG. 4 is a perspective view of a washer member disposed within the valve housing, according to an embodiment of the present disclosure.

FIG. 4 is a perspective view of the washer member 130 disposed within the valve housing 106, according to an embodiment of the present disclosure. The washer member 130 includes a base portion 142 adapted to be disposed on the support member 124. The base portion 142 includes a first surface 144 adapted to abut the base surface 134 of the support member 124. The base portion 142 further includes a second surface 146 distal to the first surface 144. The second surface 146 is adapted to abut the elastic member 126. The base portion 142 further includes an opening 148 extending between the first surface 144 and the second surface 146 configured to receive the injector push member 110 therethrough. The opening 148 defines an inner circumference 150 having a diameter greater than a diameter defined by the outer circumference of the injector push member 110. The base portion 142 further includes an outer circumference 152 distal to the inner circumference 150.

The washer member 130 further includes a side portion 154 extending from the base portion 142. The side portion 154 is configured to define a rotational movement of the washer member 130 within a tolerance limit that will be described in detail later with reference to FIG. 5. Further, the side portion 154 is configured to define a lateral movement of the elastic member 126 within a tolerance limit that will be described later with reference to FIG. 6. The side portion 154 extends vertically from the second surface 146 of the base portion 142 adjacent to the outer circumference 152. Further, the side portion 154 defines a height H extending from the first surface 144 of the base portion 142.

The washer member 130 further includes at least a first slot 156 along a first transverse axis TA1 defined by the second surface 146 of the base portion 142. In the illustrated embodiment, the washer member 130 includes a pair of the first slots 156 configured to receive the pair of ribs 138 defined in the support member 124. The pair of first slots 156 is extending from the first surface 144 of the base portion 142 along the height H of the side portion 154. Each of the first slots 156 is configured to receive each of the pair of ribs 138. Further, each of the first slots 156 may define a slot width SW1 greater than the width RW of each of the pair of ribs 138. The slot width SW1 of each of the first slots 156 may be adapted to define the rotational movement of the washer member 130 within the tolerance limit.

The washer member 130 further includes a pair of second slots 158 along a second transverse axis TA2 defined by the second surface 146 of the base portion 142. The second transverse axis TA2 is perpendicular to the first transverse axis TA1. However, it may be contemplated that the second transverse axis TA2 may be at an angle relative the first transverse axis TA1. Each of the pair of second slots 158 defines a slot width SW2 adapted to define the lateral movement of the elastic member 126 within the tolerance limit. Further, each of the pair of second slots 158 is extending from the first surface 144 of the base portion 142 along the height H of the side portion 154. Each of the pair of second slots 158 is also configured to define a washer width WW for the washer member 130 along the second transverse axis TA2. The washer width WW of the washer member 130 is less than or equal to the width SW defined by the support member 124.

In the illustrated embodiment, the slot width SW1 of each of the pair of first slots 156 and the slot width SW2 of each of the pair of second slots 158 are similar. Such that, the washer member 130 may be disposed on the base surface 134 of the support member 124 by aligning the pair of second slots 158 with the pair of ribs 138. In such a case, the pair of first slots 156 may define the washer width WW for the washer member 130 to movably receive the hydraulic lash adjusters 108. Further, the pair first slots 156 may define the lateral movement of the elastic member 126 within the tolerance limit and the pair of second slots 158 may define the rotational movement of the washer member 130 within the tolerance limit.

INDUSTRIAL APPLICABILITY

The present disclosure relates to the washer member 130 and the support member 124 of the valve housing 106 to movably receive the hydraulic lash adjusters 108 within the valve housing 106. The width SW of the support member 124 and the washer width WW of the washer member 130 adapted to define the clearance with the inner surface 125 of the wall member 114 to receive the hydraulic lash adjusters 108 within the valve housing 106.

Figure 5A:
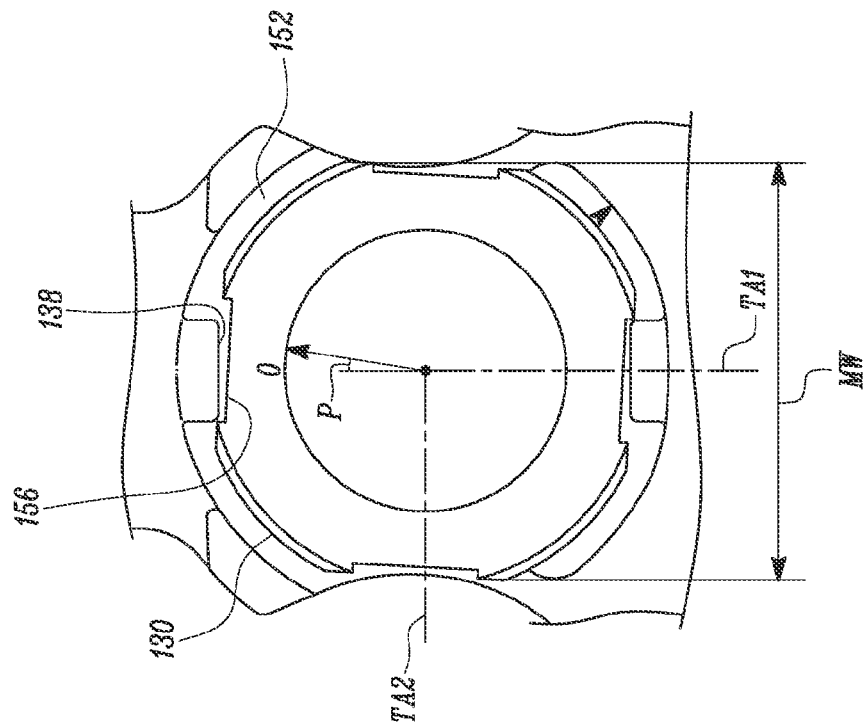
FIGS. 5A and 5B illustrate movement of the washer member relative to a support member of the valve housing, according to an embodiment of the present disclosure.
Figure 5B:
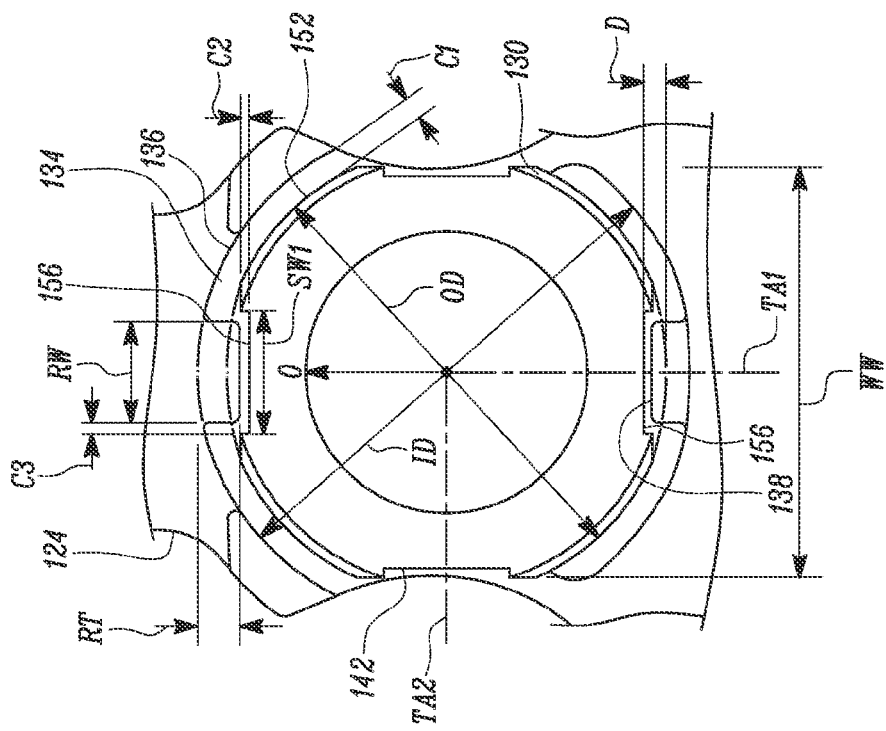

FIGS. 5A and 5B illustrate the rotational movement of the washer member 130 relative to the base surface 134 of the support member 124, according to an embodiment of the present disclosure. The wall surface 136 of the support member 124 may define an inner diameter ID for the base surface 134. The outer circumference 152 of the washer member 130 may define an outer diameter OD that is less than the inner diameter ID of the base surface 134. The inner diameter ID of the base surface 134 and the outer diameter OD of the washer member 130 may define a clearance C1. The pair of first slots 156 may be aligned with the pair of ribs 138 to dispose the washer member 130 on the base surface 134 of the support member 124. Each of the first slots 156 may have a depth D extending from the outer circumference 152 of the base portion 142. The thickness RT of each of the ribs 138 and the depth D of each of the first slots 156 may be defined in such a way that each of the ribs 138 may be received in the respective first slots 156. Further, a clearance C2 may also be defined between the ribs 138 and the first slots 156 in the first transverse axis TA1. The clearances C1 and C2 may allow the washer member 130 to move laterally within the base surface 134 of the support member 124. Further, the clearances C1 and C2 may free the washer member 130 from any impact that may be caused by the elastic member 126.

In an embodiment, an adhesive may be applied on the first surface 144 of the base portion 142 to attach with the base surface 134 of the support member 124. However, it may be contemplated that the adhesive may loose strength thereof to hold the washer member 130 with the base surface 134 in a prolonged period of operation of the engine 100. In such a case, the pair of ribs 138 received in the pair of first slots 156 may limit rotational movement of the washer member 130 relative to the base surface 134 within the tolerance limit. In the illustrated embodiment, the slot width SW1 of each of the first slots 156 and the width RW of each of the ribs 138 may define a clearance C3.

When the washer member 130 moves in a clockwise direction, as shown in FIG. 5, a side end of the of the first slots 156 may come in contact with a side end of the ribs 138 at an angle P of the washer member 130. Thus the washer member 130 is restricted from moving beyond the angle P. The angle P may be defined with reference to an angular position O shown in FIG. 5A. At the angle P, the washer member 130 may define a maximum width MW along the second transverse axis TA2 with reference to the support member 124. The maximum width MW may correspond to the tolerance limit. If the washer member 130 moves beyond the maximum width MW, then the washer member 130 may interfere with the cylinder body 108A of at least one of the hydraulic lash adjusters 108. Further, the slot width SW1 is also defined with reference to minimum dimensional clearances required for manufacturing the support member 124 with the ribs 138 and the washer member 130.

FIGS. 6A and 6B illustrate movement of the elastic member 126 relative to the washer member 130, according to an embodiment of the present disclosure. The elastic member 126 may have an outer diameter D1 less than an inner diameter D2 defined by an inner surface 162 of the side portion 154. The outer diameter D1 of the elastic member 126 and the inner diameter D2 of the washer member 130 may define a clearance C4, as shown in FIG. 6, such that the elastic member 126 may be freely disposed on the second surface 146 of the base portion 142. During operation of the engine 100, the elastic member 126 may move laterally within the washer member 130 due to the clearance C4. However, the elastic member 126 may move in the second transverse axis TA2 beyond the inner diameter D2 defined by the side portion 154 due to the pair of second slots 158. The slot width SW2 of each of the pair of second slots 158 is defined in such a way that the elastic member 126 is moved along the second transverse axis TA2 to a distance D3 either in left side or right side of the support member 124. As shown in FIG. 6B, the distance D3 is measured with reference to a center of the washer member 130. A first side end and a second side end of each of the second slots 158 may restrict displacement of the elastic member 126 to the distance D3. The distance D3 may correspond to the tolerance limit defined for maximum lateral movement of the elastic member 126. If the lateral movement of the elastic member 126 moves beyond the distance D3 either in the left side or the right side of the support member 124, then the elastic member 126 may interfere with the cylinder body 108A of the hydraulic lash adjusters 108.

In the illustrated embodiment, primary design consideration for the pair of second slots 158 is to define the washer width WW to avoid interfering with the hydraulic lash adjusters 108. Hence, to define the washer width WW, the pair of second slots 158 is defined in the base portion 142 and the side portion 154 of the washer member 130. However, the slot width SW2 is defined in the side portion 154 for limiting lateral movement of the elastic member 126 within the distance D3.

With the washer member 130 of the present disclosure, existing valve housing is modified to accommodate the hydraulic lash adjusters 108. Specifically, the support member of the existing valve housing is modified to the width SW to receive the hydraulic lash adjusters 108 within the valve housing 106. The valve housing 106 and the support member 124 may be made from aluminum. So, fretting of the support member 124 due to a load of the elastic member 126 may be avoided. Tight tolerance control is defined for the slot width SW1 and SW2 for controlling movement of the washer member 130 within the support member 124 and movement of the elastic member 126 within the washer member 130.

While aspects of the present disclosure have been particularly shown and described with reference to the embodiments above, it will be understood by those skilled in the art that various additional embodiments may be contemplated by the modification of the disclosed systems and methods without departing from the spirit and scope of what is disclosed. Such embodiments should be understood to fall within the scope of the present disclosure as determined based upon the claims and any equivalents thereof.

What is claimed is:

1. A washer member disposed in a valve housing of an engine, the washer member configured to resiliently support an injector push member via an elastic member, the valve housing configured to receive a pair of hydraulic lash adjusters for operating an inlet valve and an outlet valve of a cylinder of the engine, the washer member comprising:
   a base portion adapted to abut a support member disposed within the valve housing, the support member adapted to define a clearance with the valve housing to movably dispose the pair of hydraulic lash adjusters within the valve housing; and
   a side portion extending from the base portion, the side portion configured to define a lateral movement of the elastic member, the side portion further configured to define a rotational movement of the washer member.

2. The washer member of claim 1, wherein the base portion of the washer member comprises:
   a first surface adapted to abut the support member; and
   a second surface distal to the first surface, the second surface adapted to abut the elastic member.

3. The washer member of claim 2, wherein the base portion further comprises:
   an opening extending between the first surface and the second surface configured to receive the injector push member therethrough, the opening defines an inner circumference; and
   an outer circumference distal to the inner circumference.

4. The washer member of claim 3, wherein the side portion extends vertically from the second surface of the base portion adjacent to the outer circumference, and wherein the side portion defines a height extending from the first surface of the base portion.

5. The washer member of claim 4, wherein the washer member comprises at least a first slot along a first transverse axis defined by the second surface of the base portion, the first slot configured to receive a rib defined in the support member, and wherein the first slot is configured to define the rotational movement of the washer member.

6. The washer member of claim 5, wherein the first slot is extending from the first surface of the base portion along the height of the side portion.

7. The washer member of claim 5, wherein the washer member comprises a pair of second slots along a second transverse axis defined by the second surface of the base portion, the second transverse axis is perpendicular to the first transverse axis.

8. The washer member of claim 7, wherein each of the pair of second slots defines a slot width adapted to define the lateral movement of the elastic member.

9. The washer member of claim 7, wherein the pair of second slots is extending from the first surface of the base portion along the height of the side portion.

10. The washer member of claim 7, wherein the pair of second slots configured to define a washer width for the washer member, the washer width of the washer member is less than or equal to a width defined by the support member, wherein the width of the support member defines the clearance with the valve housing to movably dispose the pair of hydraulic lash adjusters within the valve housing.

11. A washer member disposed in a valve housing of an engine, the washer member configured to resiliently support an injector push member via an elastic member, the washer member comprising:

a base portion disposed on a support member of the valve housing, the base portion comprising:
   a first surface adapted to abut the support member; and
   a second surface distal to the first surface, the second surface adapted to abut the elastic member;
a side portion extending from the second surface of the base portion; and
a plurality of slots defined in the side portion, the plurality of slots configured to define a rotational movement of the washer member, the plurality of slots further configured to define a lateral movement of the elastic member.

12. The washer member of claim 11, wherein the base portion comprises:
   an opening extending between the first surface and the second surface, the opening configured to receive the injector push member therethrough, the opening further defines an inner circumference; and
   an outer circumference distal to the inner circumference.

13. The washer member of claim 12, wherein the side portion extends vertically from the second surface of the base portion adjacent to the outer circumference, and wherein the side portion defines a height extending from the first surface of the base portion.

14. The washer member of claim 13, wherein the washer member comprises at least a first slot along a first transverse axis defined by the second surface of the base portion, the first slot configured to receive a rib defined in the support member, and wherein the first slot is configured to define the rotational movement of the washer member.

15. The washer member of claim 14, wherein the first slot is extending from the first surface of the base portion along the height of the side portion.

16. The washer member of claim 14, wherein the washer member comprises a pair of second slots along a second transverse axis defined by the second surface of the base portion, the second transverse axis is perpendicular to the first transverse axis.

17. The washer member of claim 16, wherein each of the pair of second slots defines a slot width adapted to define the lateral movement of the elastic member.

18. The washer member of claim 17, wherein the pair of second slots is configured to define a washer width for the washer member, the washer width of the washer member is less than or equal to a width defined by the support member.

19. The washer member of claim 16, wherein the pair of second slots is extending from the first surface of the base portion along the height of the side portion.

20. A washer member disposed in a valve housing of an engine, the washer member configured to resiliently support an injector push member via an elastic member, the valve housing configured to receive a pair of hydraulic lash adjusters for operating an inlet valve and an outlet valve of a cylinder of the engine, the washer member comprising:
   a base portion adapted to abut a support member disposed within the valve housing, the support member adapted to define a clearance with the valve housing to movably dispose the pair of hydraulic lash adjusters within the valve housing, the base portion comprising:
      a first surface adapted to abut the support member; and
      a second surface distal to the first surface, the second surface adapted to abut the elastic member;
   a side portion extending from the second surface of the base portion;
   at least a first slot defined in the side portion, the first slot configured to define a rotational movement of the washer member; and
   a pair of second slots defined in the side portion spaced apart from the first slot, the pair of second slots configured to define a lateral movement of the elastic member.

* * * * *